US008866823B2

(12) United States Patent
Bellamy et al.

(10) Patent No.: US 8,866,823 B2
(45) Date of Patent: Oct. 21, 2014

(54) IN-BETWEENING INTERACTIVE STATES

(75) Inventors: Rachel K. E. Bellamy, Bedford, NY (US); Michael Desmond, White Plains, NY (US); Jacquelyn A. Martino, Cold Spring, NY (US); Paul M. Matchen, Briarcliff Manor, NY (US); John T. Richards, Hawthorne, NY (US); Calvin B. Swart, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 12/903,428

(22) Filed: Oct. 13, 2010

(65) Prior Publication Data

US 2012/0092375 A1    Apr. 19, 2012

(51) Int. Cl.
G06T 13/00    (2011.01)
G06T 11/60    (2006.01)

(52) U.S. Cl.
CPC ..................................... *G06T 11/60* (2013.01)
USPC ......................................... 345/475; 345/474

(58) Field of Classification Search
None
See application file for complete search history.

(56) References Cited

U.S. PATENT DOCUMENTS

| | | | | |
|---|---|---|---|---|
| 8,165,404 | B2 * | 4/2012 | Matulic ......................... | 382/203 |
| 2003/0222890 | A1 * | 12/2003 | Salesin et al. .................. | 345/629 |
| 2006/0077206 | A1 * | 4/2006 | Jaeger ............................ | 345/475 |
| 2008/0030504 | A1 * | 2/2008 | Brunner et al. ............... | 345/473 |
| 2008/0250012 | A1 * | 10/2008 | Hinckley et al. .................. | 707/5 |

OTHER PUBLICATIONS

Wikipedia, Storyboard, http://en.wikipedia.org/wiki/Storyboard, 2010.
Landay et al., Interactive Sketching for the Early Stages of User Interface Design, http://www.cs.berkeley.edu/~landay/research/publications/SILK_CHI/jal1bdy.html.
Landay et al., Sketching Interfaces: Toward More Human Interface Design, Computer, Mar. 2001, http://www.cs.cmu.edu/~garnet/silk-ieee-published.pdf.
Sezgin et al., Sketch based interfaces: early processing for sketch understanding, ACM SIGGRAPH 2006 Courses (Boston, Massachusetts, Jul. 30-Aug. 3, 2006), SIGGRAPH '06. ACM, New York, NY, 22. DOI= http://doi.acm.org/10.1145/1185657.1185783.
Wikipedia, Bayesian network, http://en.wikipedia.org/wiki/Bayesian_network, 2010.
Wikipedia, Simulated annealing, http://en.wikipedia.org/wiki/Simulated_annealing, 2010.
Yahoo!, Design Pattern Library, http://developer.yahoo.com/ypatterns/, 2010.

* cited by examiner

*Primary Examiner* — Daniel Hajnik
(74) *Attorney, Agent, or Firm* — Scully, Scott, Murphy & Presser, P.C.; Louis J. Percello, Esq.

(57) ABSTRACT

Automatically creating a series of intermediate states may include receiving a start state and an end state of a reactive system, identifying one or more components of the start state and the end state and determining one or more events associated with the one or more components. One or more intermediate states between the start state and the end state, and one or more transitions from and to the one or more intermediate states are created using the one or more components of the start state and the end state and the one or more events associated with the one or more components. The one or more intermediate states and the one or more transitions form one or more time-based paths from the start state to the end state occurring in response to applying the one or more events to the associated one or more components.

18 Claims, 8 Drawing Sheets

IN-BETWEENING INTERACTIVE STATES

FIELD

The present application generally relates to computer systems and more particularly to in-betweening interactive states, automatically creating the in-betweens for time-based representations of state from domain models.

BACKGROUND

In-betweening is the process of generating intermediate frames between two keyframe images to give the appearance that the first image evolves smoothly into the second image. Transformations can be motion, shape or color. In-betweens are the drawings that help create the illusion of intermediate states. Traditionally created by an animation artist using their knowledge of the transformation, but more recently in-betweens are generated by animation software using physics models, e.g., object motion, color mixing. In more complex cases, not only the start and end frames are specified, but also additional parameters may be indicated. For example, in a motion in-between, the path the object should take might be given manually by a user, parameters indicating acceleration and deceleration may be provided also manually by the user. In a shape in-between, the corresponding points in the start and end shape may be specified. Rules describing the physics of the transition between two animation states can also be specified, which might change how the object eases in and out of the motion.

"http://en.wikipedia.org/wiki/Storyboard" defines storyboard as "graphic organizers such as a series of illustrations or images displayed in sequence for the purpose of pre-visualizing a motion picture, animation, motion graphic or interactive media sequence, including website interactivity." The storyboarding process can be very tedious and intricate.

BRIEF SUMMARY

A method and a system for in-betweening interactive states are provided. The method, in one aspect, may include receiving a start state and an end state of a reactive system and identifying one or more components of the start state and the end state. The method may also include determining one or more events associated with the one or more components. The method may further include creating one or more intermediate states between the start state and the end state, and one or more transitions from and to the one or more intermediate states, using the one or more components of the start state and the end state and the one or more events associated with the one or more components. The one or more intermediate states and the one or more transitions form one or more time-based paths from the start state to the end state occurring in response to applying the one or more events to the associated one or more components.

A method for in-betweening interactive states, in another aspect, may include receiving a starting screen state and an ending screen state and identifying one or more widgets in the starting screen state and the ending screen state. The method may further include determining one or more gestures associated with the identified one or more widgets. The method may also include creating one or more intermediate screen states between the starting screen state and the ending screen state, and one or more transitions from and to the one or more intermediate screen states. The one or more intermediate screen states and the one or more transitions form one or more time-based paths from the starting screen state to the ending screen state occurring in response to applying the one or more gestures to the associated one or more widgets.

A system for automatically creating a series of intermediate states, in one aspect, may include a device model including information associated with one or more components of the reactive system and one or more events associated with the one or more components of the reactive system. The system may also include a module executable on the processor and operable to receive a start state and an end state of a reactive system. The module may be further operable to identify one or more components in the start state and the end state. The module may be yet further operable to determine one or more events associated with the one or more components in the start state and the end state. The module also may be operable to create one or more intermediate states between the start state and the end state, and one or more transitions from and to the one or more intermediate states, using the one or more components of the start state and the end state and the one or more events associated with the one or more components. The one or more intermediate states and the one or more transitions provide one or more time-based paths from the start state to the end state occurring in response to applying the one or more events to the associated one or more components.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A storyboard is a collection of frames. This storyboard might be linear and ordered by time, or branching (tree or network) in the case where one state can result in two alternative next states. Collections of states are a representation that can be used in many domains. A domain herein refers to a field or area of technology or operation. For example, collections of states in business domain may be represented by a business process diagram; collections of states in a user interface software or application domain may be represented by a user interface storyboard. Briefly, a storyboard shows a sequence of sketches that illustrate changes of action. A comic strip is another example representing a time-ordered collection of states. In-betweens could be generated for these time-based state representations using domain models, and existing examples. A domain model describes various entities involved in a domain and their relationships, and provides a structural view of the domain's main components, their attributes and relationships. For example, a domain model of a computer system may include various components of the system and their relationships. Another example of a domain model in software engineering includes a business process modeling (BPM) which provides a graphical representation of business process information modeled, for instance, using business process modeling notation (BPMN) and unified modeling language (UML).

The present disclosure in one aspect may provide a tooling or software for interaction designers, those who design, for example, software interfaces. For instance, in placing a user interface component such as a button component on a user interface display screen during a design stage, the system and/or method of the present disclosure may enable a designer to automatically storyboard the transitions and possible outcomes of the interactions with respect to that button. Such storyboard would provide information such as the description of the button and how the button would affect the user interface display screen and various transitions associated with the button.

More generally, the present disclosure describes a system and method that given a starting state and an ending state automatically creates the in-betweens or intermediate states from domain models. Given the input starting and ending states and also based on the existing knowledge of the domain or area to which the input states apply, a system and/or method of the present disclosure in one embodiment may determine one or more possible series of intermediate states and inter-state transitions. The system and/or method or the present disclosure in one embodiment may also select and automatically generate the states from start to end. For instance, given the input starting and ending states, all possible paths from the starting and ending states may be generated.

Intermediate states are states that occur between a start state and an end state. Transitions refer to the relationship between adjacent states. Inter-state transitions are transitions that may occur between the given start and end states.

The system and method of the present disclosure are described herein with reference to a user interface as an example domain and various states of the user interface as a time-based representation of states. Other applications are possible such as but not limited to business domain with business process states and mechanical processing domain with mechanical process states.

Referring back to the software interface example, a system and/or method in the present disclosure in one embodiment may provide the capability to describe a sequence of user interface interactions as a storyboard. Such storyboards may be created prior to developing a user interface application to demonstrate how the user interface should support a particular user interaction. Intermediate frames in a user interface storyboard represent how a widget responds to a user interaction. A widget refers to an element of the user interface, e.g., tool or item component of the user interface such as a button, menu, and others.

Figure 1:
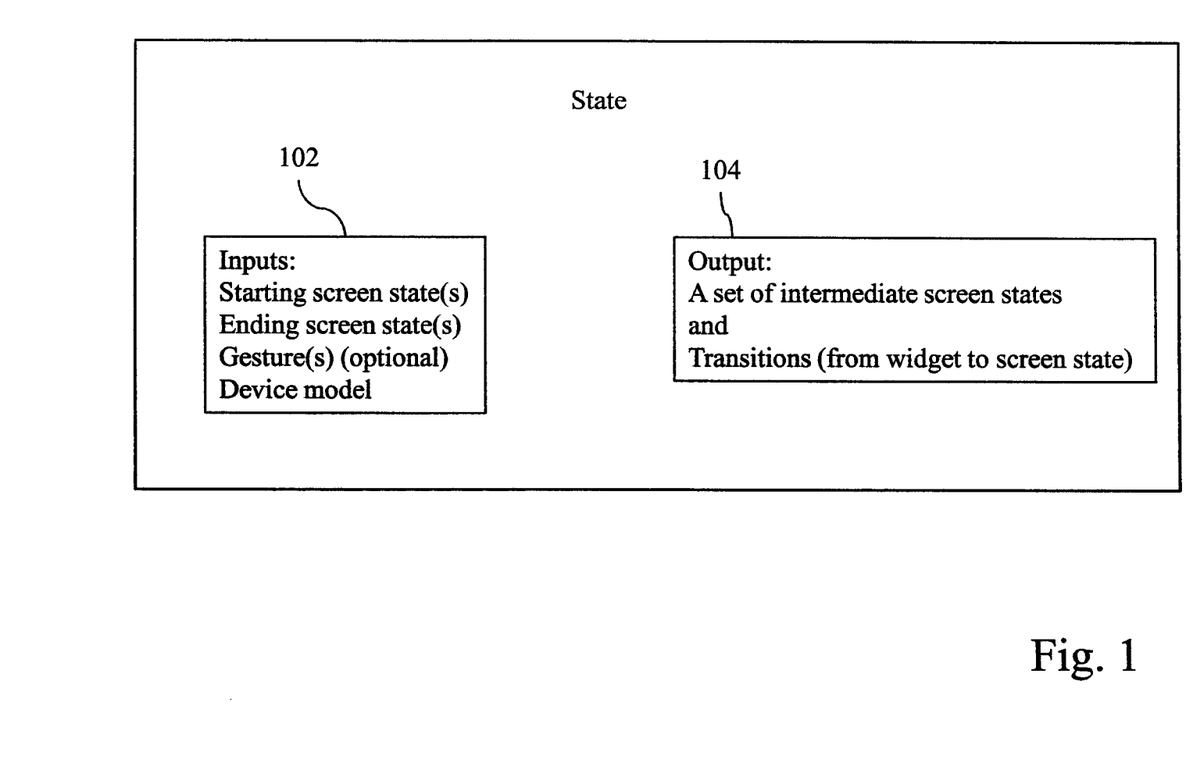
FIG. 1 shows input and output of the system and method of the present disclosure in one embodiment.

FIG. 1 shows input and output of the system and method of the present disclosure in one embodiment. Inputs may include a starting state, an ending state and a device model. A device model is a representation of information about a component (or device). For example, a device model includes information about a component that is being designed and whose intermediate states and transitions are desired to be generated. A device model may be implemented as a knowledge base and/or data structure that stores data or information about the device.

As shown in FIG. 1, an example of a starting state may be a starting screen state, a static display of a screen. An example of an ending state may be an ending screen state, another static display of a screen after interacting with a device. An example of a device may be a user interface, for instance, having a collection of components or elements (widgets) of the user interface. An example of a widget is a button element or tool. An example of a device model may be a data structure that contains information about the user interface. A device model is further described with reference to FIG. 2.

Outputs may include a set of intermediate screen states and transitions. A set of intermediate screen states may be generated from a collection of transitions which takes state N and maps it to state N+1.

Figure 2:
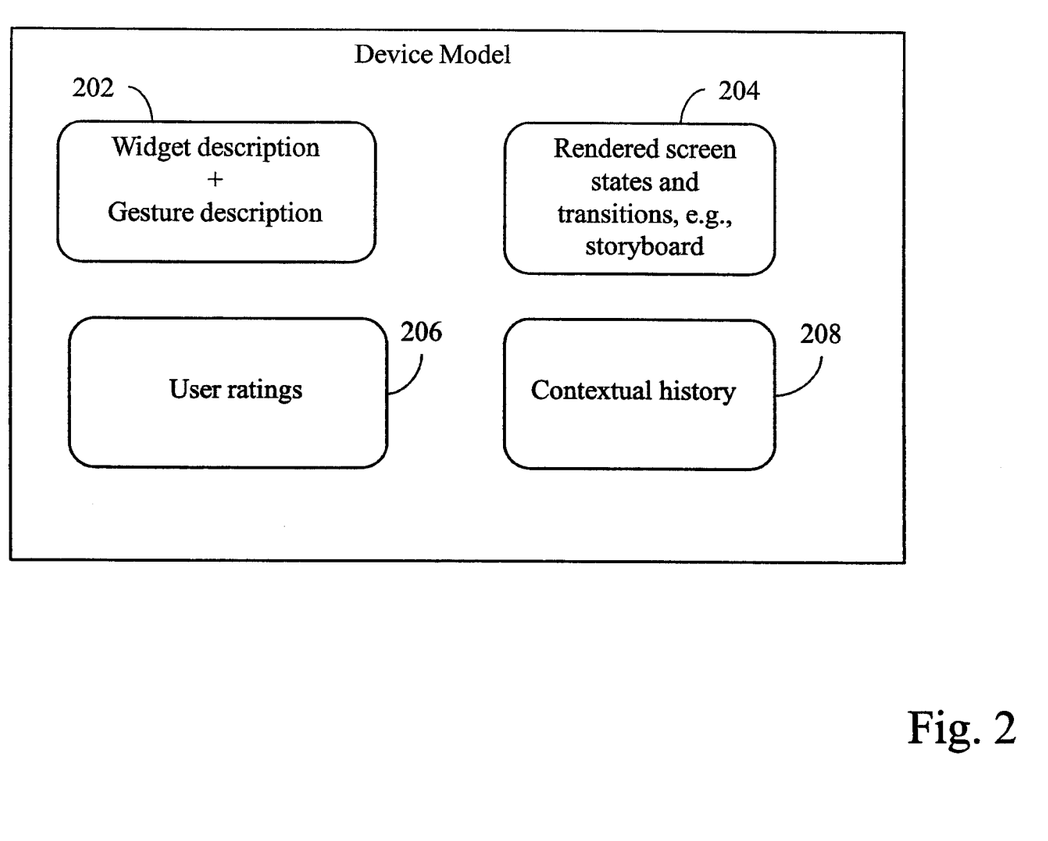
FIG. 2 illustrates a device model in one embodiment of the present disclosure.

FIG. 2 illustrates a device model in one embodiment of the present disclosure. A device model includes information about a device and one or more components of the device, e.g., a widget and gestures 202. The device model may contain widget description, for example, a text that describes what it is, for instance, a button, rectangle shape, or others. For example, widget description may specify that the widget is a 2-dimensional (2-D) sketch or drawing, 3-dimensional (3-D) sketch or drawing, 3-D layers that make up the widget, depth information about the widget, size of the widget, 4-dimensional (4-D) information such as what the widget does in time. Other description about the widget may include what is contained in the widget, for example, widget-switch states. Take for example, a widget that is a button element. The button may have a pressed state and a released state.

The device model also includes descriptions of an event or stream of events—also called gestures—associated with a widget, which define the triggering conditions for performing a transition between states. An example of an event associated with a button element may be "mouse down within the boundary of the button". Each widget has associated with it a collection of these descriptions of triggering events.

The device model may include rules that match a widget and associated gestures to one or more screen states and transition. In another aspect, the device model may include rules that generate one or more screen states and transitions given a widget and associated gestures. A rule may have the form: widget+gesture→screen state+transition. Given one or more elements in the left side of the rule (widget and/or gesture), screen state and/or transition may be generated using the rule.

The device model may further include rendered screen states and transitions, possibly taking the form of a storyboard as shown in 204. Rendered screen states may include a plurality of static display screens that show different displays resulting from an action performed with respect to a widget. Transitions may include possible actions that may occur with respect to a widget. The set of states and transitions are discrete, in that a given state or transition may be associated with one or more widgets or gestures.

The device model may also include user ratings 206 that specify, for example, one or more user identifiers of those users who rated this widget and gesture combination, and the ratings the one or more users gave, for example, good, bad, interesting match.

The device model may further include contextual history 208, for example, the past usage for the widget. Such information may also include what other widget and gesture the current widget was associated with and/or occurred with in the past. For instance, a contextual history 208 may include information that indicates that the button element was used to turn on/off a light switch, open/close a door, start/stop an engine, and others. This element 208 may also include the current and/or possible future uses of the widget.

Figure 3:
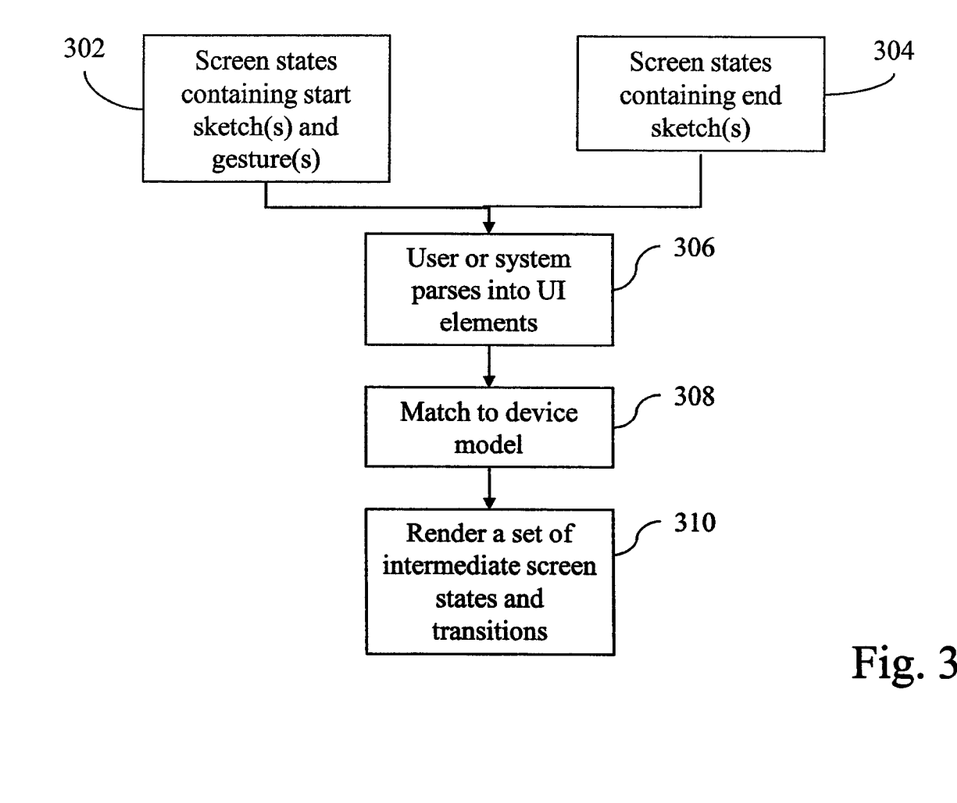
FIG. 3 illustrates a method for creating in-between states in one embodiment of the present disclosure.

FIG. 3 illustrates a method for creating in-between states in one embodiment of the present disclosure. At 302, a starting state may be obtained. For instance, using the user interface as an example, a starting screen state is provided as a sketch. The sketch may be in the form of a hand-drawn drawing, a screen capture of a display, and/or other representation that shows or provides information about the starting state. Gestures may also be captured along with the sketch, (e.g. a demonstration of a click on a button). At 304, an ending state may be obtained. Continuing with the user interface example, an ending screen state may be provided as a sketch. The sketch may be in the form of a hand-drawn drawing, a screen capture of a display, and/or other representation that shows or provides information about the ending state.

At 306, the input starting state and ending state are parsed. For example, the screen sketches are parsed to identify individual user interface (UI) elements (widgets) such as a button and others. Parsing of UI may be done using the technology described in Interactive Sketching for the Early Stages of User Interface Design, "http://www.cs.berkeley.edu/~landay/research/publications/SILK_CHI/jal1bdy.html"; Sketching Interfaces: Toward More Human Interface Design, "http://www.cs.berkeley.edu/~landay/research/publications/silk-ieee-published.pdf"; and Sezgin, T. M., Stahovich, T., and Davis, R. 2006. Sketch based interfaces: early processing for sketch understanding. In ACM SIGGRAPH 2006 Courses (Boston, Mass., Jul. 30-Aug. 3, 2006). SIGGRAPH '06. ACM, New York, N.Y., 22. DOI=http://doi.acm.org/10.1145. The publications are incorporated herein by reference.

At 308, matches of the one or more UI elements (widgets) identified at 306 to the device model are determined. That is, UI elements identified at 306, which are also described in the device model are identified. Details of determining the UI element matches to the device model are shown in FIG. 4 in one embodiment of the present disclosure.

At 310, a set of intermediate states and transitions is rendered. For example, a set of intermediate screen states in a timeline series and transitions are created.

Figure 4:
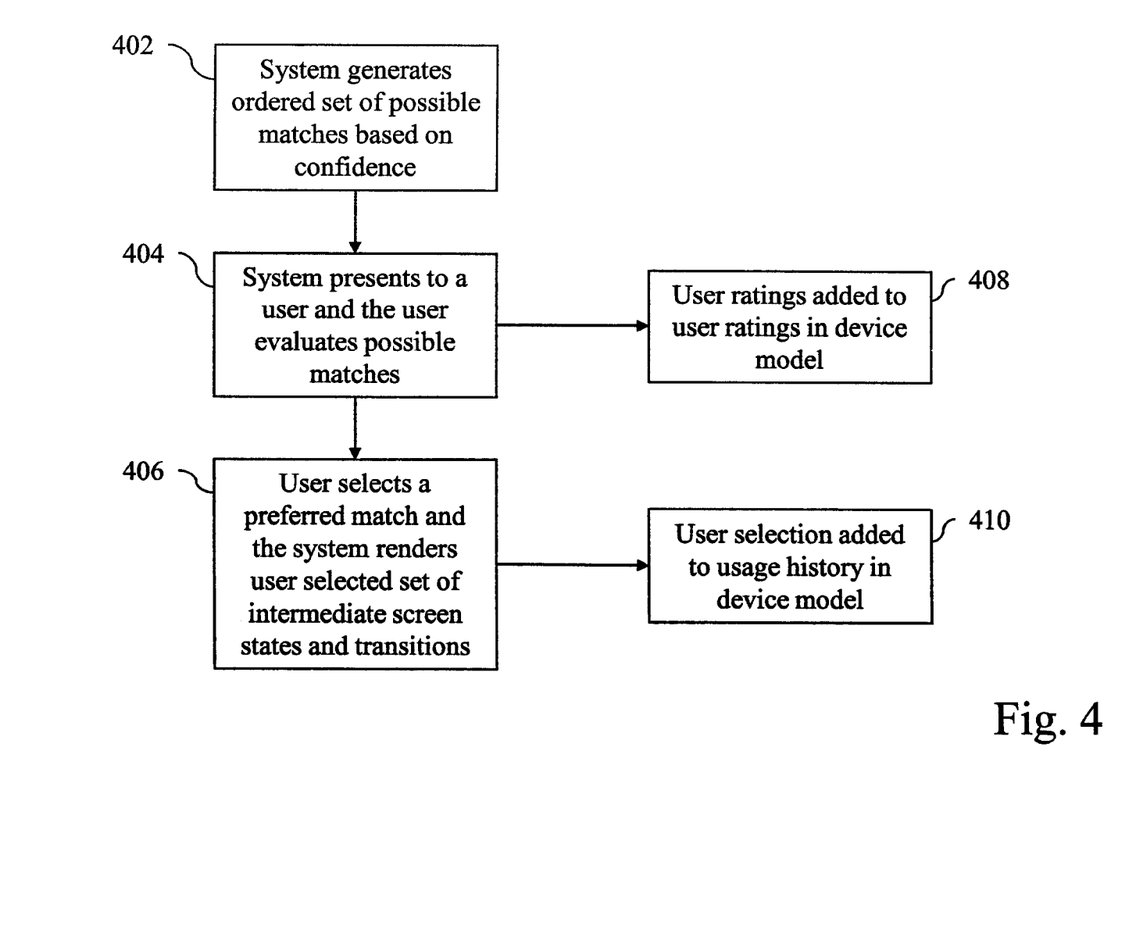
FIG. 4 illustrates a method that matches the UI elements to a device model in one embodiment of the present disclosure.

FIG. 4 illustrates a method that matches the UI elements to those from the device model in one embodiment of the present disclosure. A UI element is matched against candidates from the device model (e.g., device model database). At 402, the system of the present disclosure in one embodiment generates a set of possible matches based on confidence. This step is further explained with reference to FIG. 5. In one embodiment of the present disclosure, matches are determined by some tolerable similarity between source (UI element) and target (device model database element) based on characteristic such as shape, style, behavior, and others. The set may be an ordered set. The possible matches inform the generation of the possible intermediate states which form a path from the start to the end states.

At 404, the system presents to a user the retrieved set of matches. That is, the elements in the device model database that matched the identified elements in the input and output screen states are presented to the user. The generated set of matches may have been optionally ordered. The user may evaluate the presented set of matches. The evaluations may be further ordered by prior user ratings of the similarity between the sketched element and the elements in the device model.

Examples of user ratings include, but are not limited to, whether the elements in the input and/or output states as compared to the matched elements from the device model are completely different, similar enough, almost similar enough, exactly the same. The user may rate the matched elements, for instance, based on visual sameness based on the user's tolerance for similarity.

At 406, the user may select a preferred match. The system of the present disclosure in one embodiment presents the set of intermediate screen states and transitions based on the user selection. That is, based on user's preferred match, the system of the present disclosure in one embodiment generates the intermediate screen shots and transitions using the information stored in the device model (database).

At 408, the user ratings are added to the user rating description in the device model. At 410, the user selected set is added to usage history in the device model.

Figure 5:
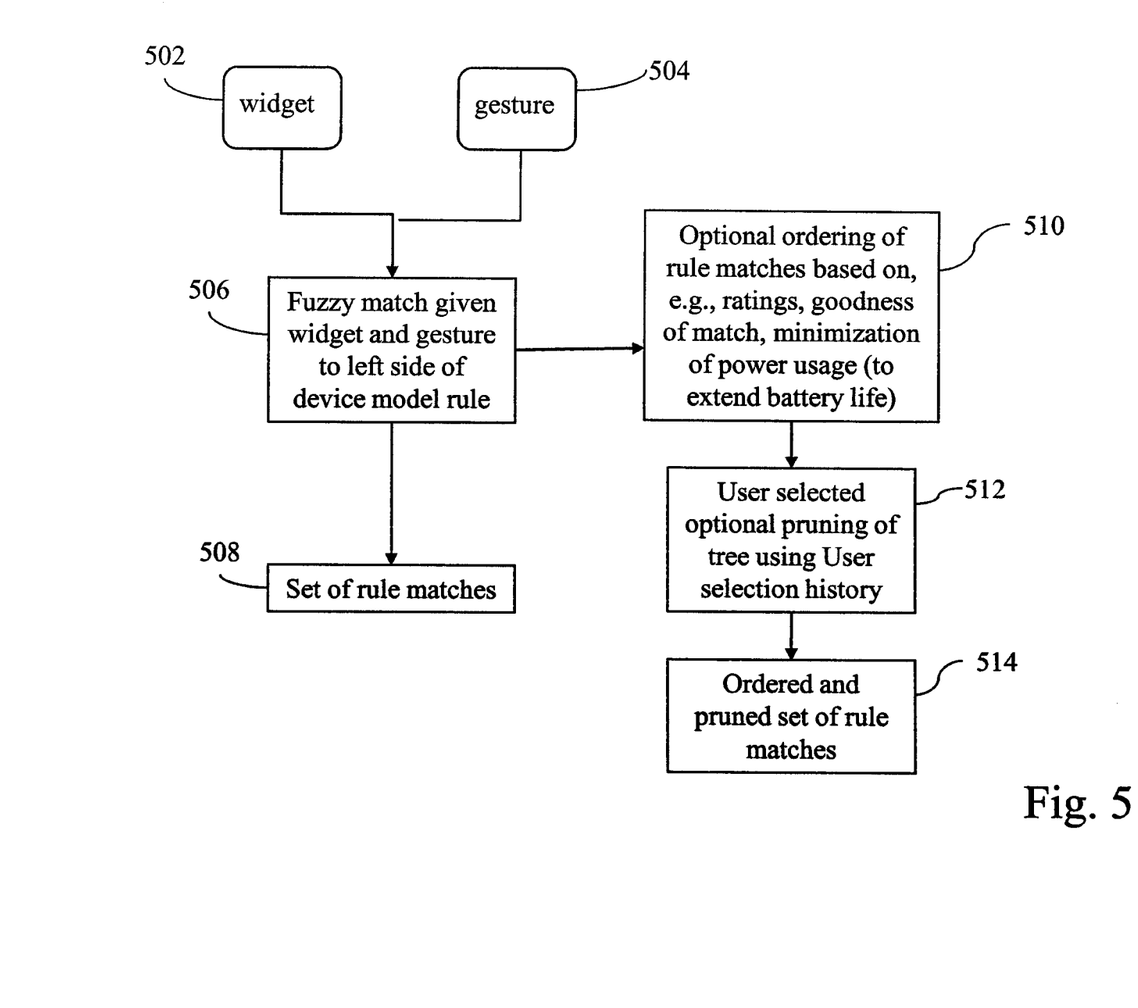
FIG. 5 illustrates a method for generating a set of possible matches in one embodiment of the present disclosure.

FIG. 5 illustrates a method for generating a set of possible matches (FIG. 4 at 402) in one embodiment of the present disclosure. In one embodiment, a widget 502 (e.g., the UI element parsed and identified from the start and end screen states), and/or a gesture 504 (e.g., an action demonstrated on the starting screen state) is used as input to a fuzzy matching algorithm at 506. "Http://en.wikipedia.org/wiki/Bayesian_network" and "http://en.wikipedia.org/wiki/Simulated_annealing" describe some examples of matching algorithms that may be utilized to match the widget and gesture to intermediate states and transitions. The fuzzy matching algorithm matches the input widget 502 and/or gesture 504 to the left side of device model rules. For example, recognizing there is a button in the device model and that it responds to an event (gesture) such as mouse down, the system of the present disclosure in one embodiment may generate an intermediate state reflective of the condition of the button being visually depressed. Intermediate states (204) are stored in the device model. They are pre-defined, defined by an author, or derived from automated analysis of existing examples of UIs.

At 508, a set of rule matches determined at 506 are output. Optionally at 510, the rule matches determined at 508 are ordered based on criteria such as user ratings and/or the goodness of match. This can be defined automatically by the system based on historic data, or by the system based on number of matching features. E.g., in the case of a square if the user is tolerant to fuzzy shape then the "corners" would not need to be perfect right angle whereas if the user is not tolerant to fuzzy shape, then the "corners" would need to be perfectly right.

At 512, a user may optionally select to trim the result set by eliminating items. For instance, the user may select to remove those results that are not within their tolerance for sameness. The system may perform the trimming using User selection history, i.e., history of what this user has previously selected.

At 514, the optionally ordered and optionally pruned set of rule matches is output.

Figure 6:
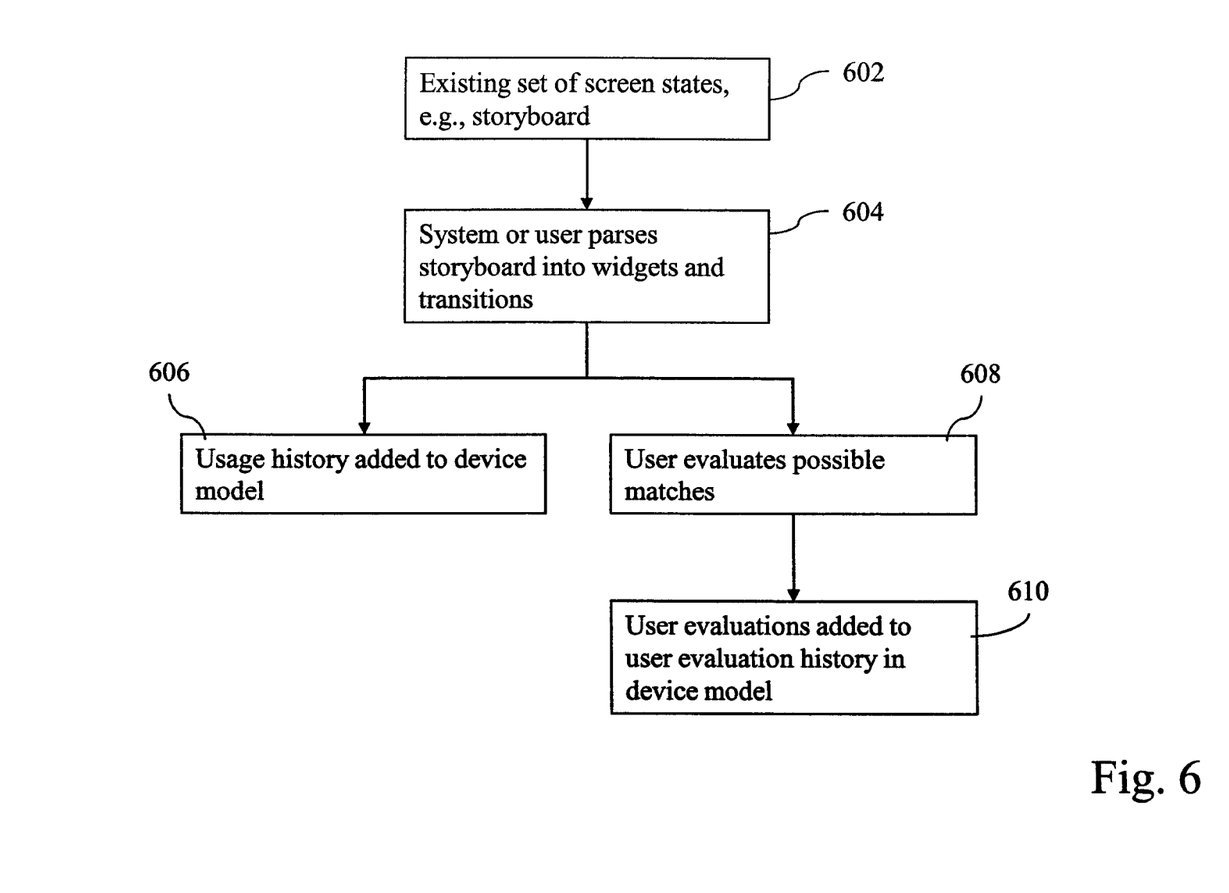
FIG. 6 illustrates a method for populating an empty device model in one embodiment of the present disclosure.

FIG. 6 illustrates a method in one embodiment of generating or populating a device model. For example, the device model of the present disclosure in one embodiment may be initially empty, i.e., there is no information or data in the device model yet. The present disclosure in one embodiment provides a methodology to create a device model dynamically, and also even as it is being used, to be updated with additional information.

At 602, existing set of screen states, for example, storyboard may be obtained. These are the set of states between which the system of the present disclosure in one embodiment eventually would generate transitions. The data from which the screen states are derived is input by the user. For example, a user might draw them by hand or assemble a collection of known widgets for user interface repositories. One example of such a repository could be http://developer.yahoo.com/ypatterns/. As another example, the user may provide a software application code that can be analyzed to produce the set of possible screen states, user gestures and transitions between states.

At 604, the system of the present disclosure may parse the storyboard into one or more widgets and transitions. In another aspect, a user may perform the parsing to identify one or more widgets and transitions in the storyboard. This process identifies a particular starting state for a widget, associated end-states, and transitions between starting state and each possible end-state. Actions associated with transitions are also identified, e.g. click, or drag. These are used to build the device model rules.

Some of the identified widgets may be matches for existing content in the device model. The system identifies such matches. At 608, the user evaluates these matches and indicates whether they are correct or not. At 610, these user evaluations of the matches are added to the user evaluation history.

At 606, usage history is added to the device model. Usage history may be obtained from keeping records of the choices made by the user.

Figure 7:
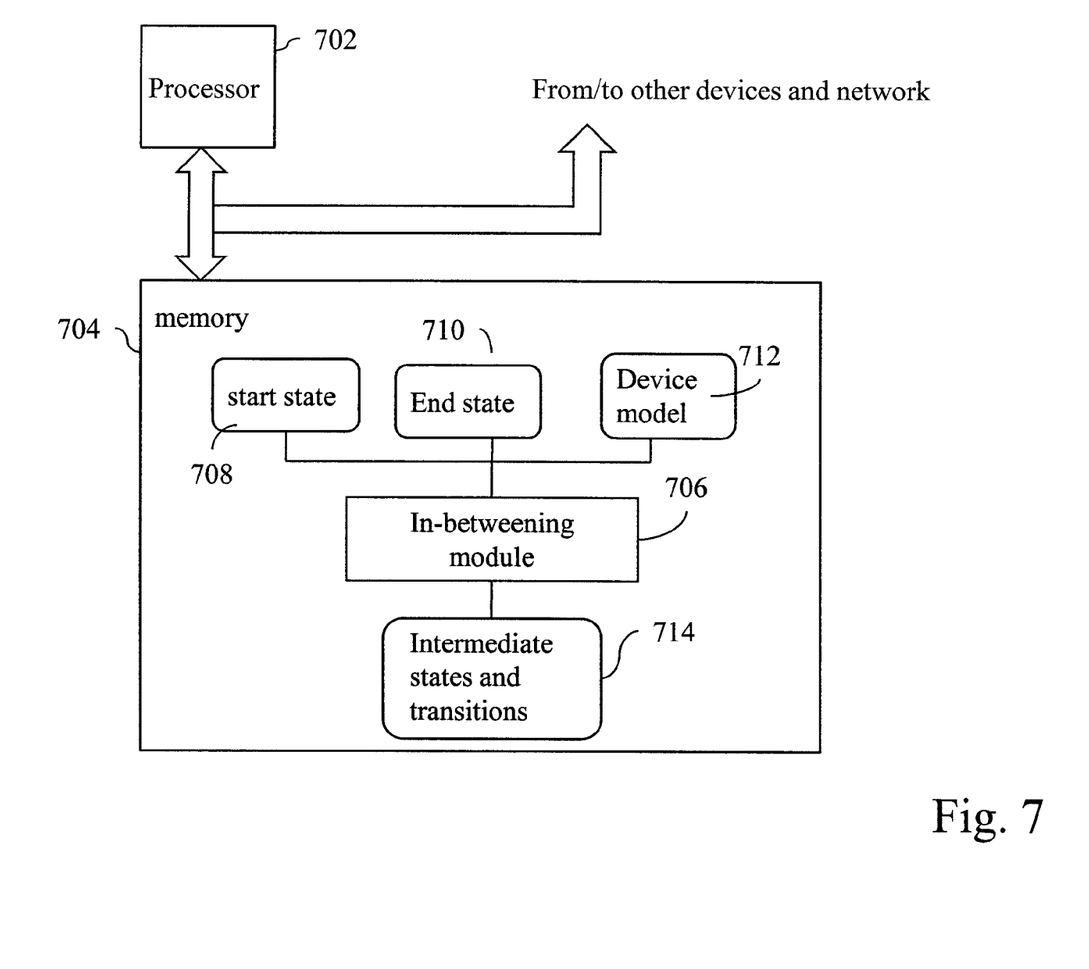
FIG. 7 is a block diagram illustrating various system components for creating in-between states in one embodiment of the present disclosure.

FIG. 7 is a block diagram illustrating various system components for creating in-between states in one embodiment of the present disclosure. The system in one embodiment may include a processor 702 that executes a program of instructions, for instance, by loading instructions and data from memory 704 for carrying out a methodology of the present disclosure. An in-betweening module 706 is operable to receive input of a start state 708, an end state 710, and a device model 712, and produce a set of intermediate states and transitions 714. The start state 708 and the end state 710 are in a time-based representation. The device model 712 may include description of the start state and the end state, one or more gestures associated with the start state and the end state, one or more rendered states and transitions. The in-betweening module 706 creates a plurality of intermediate states between the start state and the end state, and one or more transitions from and to the plurality of intermediate states. The in-betweening module 706 may be further operable to update the device model 712.

The device model 712 includes a specification of input start state and one or more transitions from that state, a specification of input end state and one or more transitions to that state. The Intermediate states may include specification of that intermediate state and one or more transitions to and from that state. Specific domain knowledge may be used to constrain the intermediate states. The intermediate states may be further editable. For example, components of the intermediate states may be edited (e.g., widgets displayed on an intermediate state display screen may be repositioned, removed, added; gestures to states may be also added, removed, modified or otherwise edited). The changes or edits made to the intermediate states may also produce changes or affect the content of one or more other dependent intermediate states, the dependent intermediates states being those states that have been generated from the same start state as the edited state. The dependent intermediates states may have been pre-defined or specified in the associated domain model. The changes or edits made one or more intermediate states may also affect or change the set or sequence of possible intermediate states.

In another aspect, the intermediate states may be used as start or end states, for example, of another widget or component. The states may include multimedia elements, visual and audio elements, visual and textual elements, and others.

In yet another aspect, the number of gestures associated with a component (e.g., a widget) may be constrained or selected by a user or the system for use determining (matching) the associated set(s) of intermediate screen states.

In still yet another aspect, the system and/or method of the present disclosure may provide the ability to specify the number of intermediate states between the start state and the end state. The determined possible sets of intermediate states then would be constrained by this parameter. In this case, the number of intermediate states chosen from a larger number of available intermediate states may be evenly spaced apart (temporally) in time-based representation in one embodiment.

The system and/or method of the present disclosure also may provide the ability to present multiple intermediate paths between start and stop (end) states where a path is a collection of intermediate states between the start and the stop (end) states. The user may choose to allow multiple paths to exist, or may order them, or may remove one or more of them.

The present embodiment also allows for a user to provide a candidate set of intermediate states for evaluation by the system. The system may determine that the intermediate states are possible, may suggest alternatives to one or more of these states, or reject one or more of the intermediate states as not being possible.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributed on the network.

Figure 8:
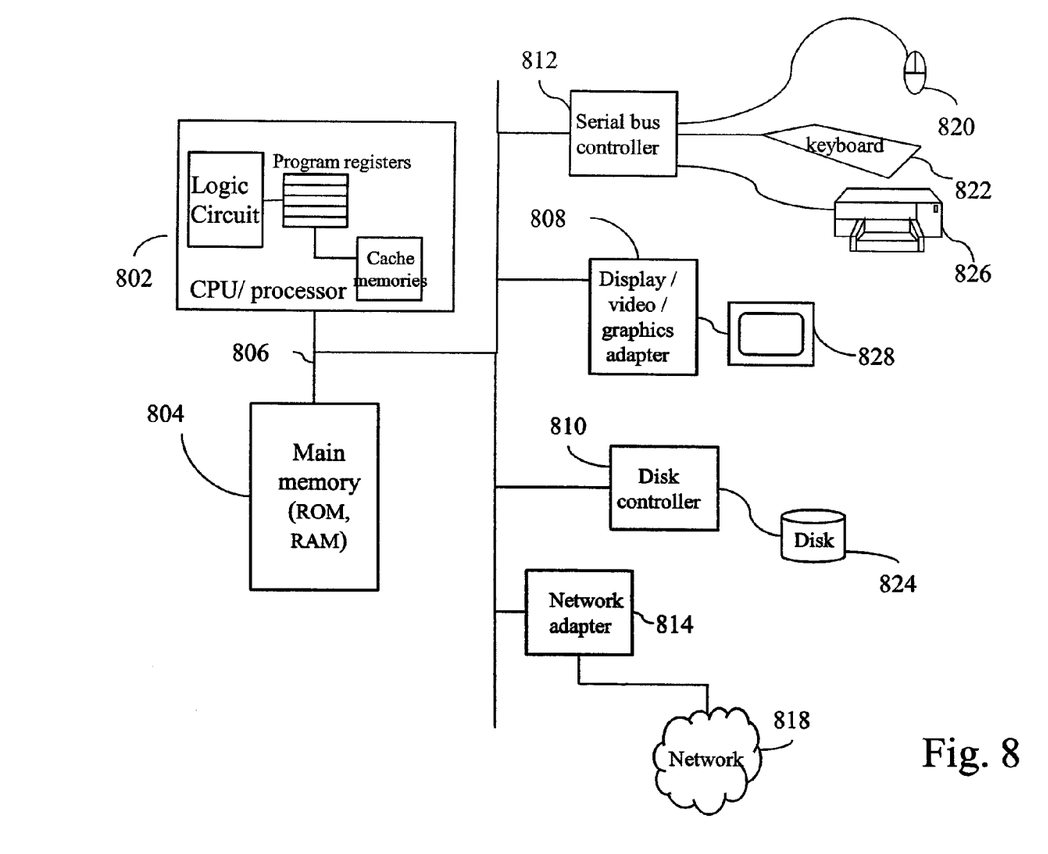
FIG. 8 illustrates an example of a computer system, in which the systems and methodologies of the present disclosure may be carried out or executed.

FIG. 8 illustrates an example computer system that may implement the system and/or method of the present disclosure. One or more processors or processing units may be central processing units (CPUs) 802, and may include arithmetic/logic unit (ALU) and/or other logic circuit, fast cache memory and registers and/or register file. Registers are small storage devices; register file may be a set of multiple registers. Caches are fast storage memory devices, for example, comprising static random access (SRAM) chips. Caches serve as temporary staging area to hold data that the CPU 802 uses. Shown is a simplified hardware configuration. CPU 802 may include other combination circuits and storage devices. One or more central processing units (CPUs) 802 execute instructions stored in memory 804, for example, transferred to registers in the CPU 802. Buses 806, for example, are electrical wires that carry bits of data between the components. Memory 804 may include an array of dynamic random access memory (DRAM) chips, and store program and data that CPU 802 uses in execution. The system components may also include input/output (I/O) controllers and adapters connected to the CPU 802 and memory 804 via a bus, e.g., I/O bus and connect to I/O devices. For example, display/graphic adapter connects 808 a monitor 828 or another display device/terminal; disk controller 810 connects hard disks 824, for example, for permanent storage; serial controller 812 such as universal serial bus (USB) controller may connect input devices such as keyboard 822 and mouse 820, output devices such as printers 826; network adapter 814 connects the system to another network, for example, to other machines. The system may also include expansion slots to accommodate other devices to connect to the system. For example, a hard disk 824 may store the program of instructions and data that implement the above described methods and systems, which may be loaded into the memory 804, then into the CPU's storage (e.g., caches and registers) for execution by the CPU (e.g., ALU and/or other combinational circuit or logic). In another aspect, all or some of the program of instructions and data implementing the above described methods and systems may be accessed, and or executed over the network 818 at another computer system or device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for in-betweening interactive states, comprising:

receiving a start state comprising a user-provided first screen sketch comprising a plurality of user-interface widgets and an end state comprising a user-provided second screen sketch comprising the plurality of user-interface widgets of a reactive system as input for determining one or more intermediate states that are possible between the start state and the end state;

identifying one or more components of the start state and the end state by at least parsing the first and second user-provided screen sketches;

matching the one or more components comprising the plurality of user-interface widgets in the user-provided first and second screen sketches of the start state and the end state with a device model's one or more components by at least evaluating a plurality of closest candidates from a collection of components stored in the device model, the device model comprising information identifying one or more components of the reactive system, one or more events associated with the one or more components of the reactive system and one or more rules for generating the one or more intermediate states, the one or more events defining one or more triggering conditions for performing a transition;

determining one or more events associated with the one or more components of the start state and the end state from the device model based on the matching; and creating, by a processor, the one or more intermediate states between the start state and the end state, and one or more transitions from and to the one or more intermediate states, using the one or more components of the start state and the end state and the one or more events associated with the one or more components, the one or more intermediate states and the one or more transitions forming one or more time-based paths from the start state to the end state occurring in response to applying the one or more events to the associated one or more components, wherein all possible paths from the start state and the end state can be generated and presented to a user.

2. The method of claim 1, wherein the information further includes user ratings.

3. The method of claim 1, wherein the information further includes usage history.

4. The method of claim 1, wherein the start state and the end state are associated with user interface states, business process states, or mechanical process states, or combinations thereof.

5. The method of claim 1, wherein the start state and the end state include one or more multimedia elements, one or more visual and audio elements, one or more visual and textual elements, or combinations thereof.

6. The method of claim 1, wherein the determining step further includes presenting to a user all events found in the device model which are associated with the identified one or more components, and allowing the user to select one or more events from said all events.

7. The method of claim 1, wherein the one or more intermediate states are editable.

8. The method of claim 7, wherein editing an intermediate state automatically causes another one of the one or more intermediate states to be changed.

9. The method of claim 1, further including allowing a user to select one or more intermediate states from an automatically generated set of intermediate states.

10. The method of claim 1, wherein a user specifies a number of intermediate states to be created between the start state and the end state.

11. A method for in-betweening interactive states, comprising:
receiving a starting screen state comprising a user-provided first screen sketch comprising a plurality of user-interface widgets and an ending screen state comprising a user-provided second screen sketch comprising the plurality of user-interface widgets as input for determining one or more intermediate states that are possible between the starting screen state and the ending screen state;
identifying one or more widgets in the starting screen state and the ending screen state by at least parsing the first and second user-provided screen sketches;
determining one or more gestures associated with the identified one or more widgets, using a device model that comprises information associated with one or more widgets and one or more gestures associated with the one or more widgets, wherein said one or more identified widgets comprising the plurality of user-interface widgets in the user-provided first and second screen sketches of the starting screen state and the ending screen state are matched with the information in the device model by at least evaluating a plurality of closest candidates from a collection of components stored in the device model; and
creating, automatically by a processor, one or more intermediate screen states between the starting screen state and the ending screen state, and one or more transitions from and to the one or more intermediate screen states, the one or more intermediate screen states and the one or more transitions forming one or more time-based paths from the starting screen state to the ending screen state occurring in response to applying the one or more gestures to the associated one or more widgets determined from the device given the starting screen state and the ending screen state,
wherein all possible paths from the starting screen state and the ending screen state can be generated and presented to a user.

12. The method of claim 11, wherein the information further includes user ratings.

13. The method of claim 11, wherein the information further includes usage history.

14. A computer readable storage medium, that is not a signal per se, storing a program of instructions executable by a machine to perform a method for automatically creating a series of intermediate states, the method comprising:
receiving a start state comprising a user-provided first screen sketch comprising a plurality of user-interface widgets and an end state comprising a user-provided second screen sketch comprising the plurality of user-interface widgets of a reactive system as input for determining one or more intermediate states that are possible between the start state and the end state;
identifying one or more components of the start state and the end state by at least parsing the first and second user-provided screen sketches;
matching the one or more components comprising the plurality of user-interface widgets in the user-provided first and second screen sketches of the start state and the end state with a device model's one or more components by at least evaluating a plurality of closest candidates from a collection of components stored in the device model, the device model comprising information identifying one or more components of the reactive system, one or more events associated with the one or more components of the reactive system and one or more rules for generating the one or more intermediate states, the one or more events defining one or more triggering conditions for performing a transition;
determining one or more events associated with the one or more components of the start state and the end state from the device model based on the matching; and
creating, by a processor, one or more intermediate states between the start state and the end state, and one or more transitions from and to the one or more intermediate states, using the one or more components of the start state and the end state and the one or more events associated with the one or more components, the one or more intermediate states and the one or more transitions forming one or more time-based paths from the start state to the end state occurring in response to applying the one or more events to the associated one or more components, wherein all possible paths from the start state and the end state can be generated and presented to a user.

15. The computer readable storage medium of claim 14, wherein the device model is dynamically created.

16. A system for automatically creating a series of intermediate states, comprising:
a processor;
a device model comprising information associated with one or more components of the reactive system, one or more events associated with the one or more components of the reactive system and one or more rules for generating the one or more intermediate states, the one or more events defining one or more triggering conditions for performing a transition; and
a module executable on the processor and operable to receive a start state comprising a user-provided first screen sketch comprising a plurality of user-interface widgets and an end state comprising a user-provided second screen sketch comprising the plurality of user-interface widgets of a reactive system as input for determining one or more intermediate states that are possible between the start state and the end state, the module further operable to identify one or more components in the start state and the end state by at least parsing the first and second user-provided screen sketches, the module further operable to match the one or more components comprising the plurality of user-interface widgets in the user-provided first and second screen sketches of the start state and the end state with the device model's one or more components by at least evaluating a plurality of closest candidates from a collection of components stored in the device model, the module further operable to determine one or more events associated with the one or more components in the start state and the end state of the start state and the end state from the device model based on the matching, the module further operable to create the one or more intermediate states between the start state and the end state, and one or more transitions from and to the one or more intermediate states, using the one or more components of the start state and the end state and the one or more events associated with the one or more components, the one or more intermediate states and the one or more transitions forming one or more time-based paths from the start state to the end state occurring in response to applying the one or more events to the associated one or more components, wherein all possible paths from the start state and the end state can be generated and presented to a user.

17. The system of claim 16, wherein the device model further includes user ratings associated with one or more components of the reactive system and associated one or more events and usage history of the one or more components associated with the reactive system.

18. The system of claim 16, wherein the device model is dynamically created.

* * * * *